United States Patent
Cheung (10) Patent No.: US 9,684,841 B2
(45) Date of Patent: Jun. 20, 2017

(54) METHOD OF TRANSMITTING MOVING IMAGE AND SURVEILLANCE SYSTEM USING THE METHOD

(71) Applicant: Hanwha Techwin Co., Ltd., Changwon-si (KR)

(72) Inventor: Sweungwon Cheung, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/629,891

(22) Filed: Feb. 24, 2015

(65) Prior Publication Data

US 2016/0247257 A1 Aug. 25, 2016

(51) Int. Cl.
| | |
|---|---|
| G06K 9/00 | (2006.01) |
| G06K 9/32 | (2006.01) |
| G06T 5/50 | (2006.01) |
| G06T 11/60 | (2006.01) |
| H04N 21/00 | (2011.01) |
| H04N 7/18 | (2006.01) |

(52) U.S. Cl.
CPC .............. *G06K 9/3233* (2013.01); *G06T 5/50* (2013.01); *G06T 11/60* (2013.01); *H04N 7/18* (2013.01); *H04N 7/181* (2013.01); *H04N 21/00* (2013.01); *G06T 2207/10016* (2013.01); *G06T 2207/20221* (2013.01); *G06T 2207/30232* (2013.01)

(58) Field of Classification Search
CPC .... H04N 19/17; H04N 19/132; H04N 19/167; G06K 9/36
See application file for complete search history.

(56) References Cited

U.S. PATENT DOCUMENTS

| | | | |
|---|---|---|---|
| 7,702,015 B2 | 4/2010 | Richter et al. | |
| 2003/0123751 A1* | 7/2003 | Krishnamurthy | H04N 19/46 382/282 |
| 2003/0227556 A1* | 12/2003 | Doyle | G06F 3/0481 348/239 |
| 2008/0129844 A1* | 6/2008 | Cusack | H04N 5/23245 348/241 |
| 2009/0066782 A1* | 3/2009 | Choi | H04N 3/155 348/25 |
| 2012/0275718 A1* | 11/2012 | Takamori | G06K 9/36 382/238 |
| 2015/0163414 A1* | 6/2015 | Nikkanen | H04N 5/353 348/229.1 |

FOREIGN PATENT DOCUMENTS

| | | |
|---|---|---|
| JP | 2006-287893 A | 10/2006 |
| KR | 10-2010-0121885 A | 11/2010 |

* cited by examiner

*Primary Examiner* — Li Liu
(74) *Attorney, Agent, or Firm* — Sughrue Mion, PLLC (57) ABSTRACT

A method of transmitting a moving image and surveillance system using the method are provided. The method includes: receiving a frame image having a first resolution from a camera; generating a first frame image having the first resolution and a second frame image having a second resolution with respect to the frame image of a moving image; extracting an image of a setting region from the first frame image having the first resolution that is higher than the second resolution; generating a combined frame image by combining the extracted image of the setting region and the second frame image having the second resolution; and transmitting the combined frame image to a client apparatus.

17 Claims, 8 Drawing Sheets

METHOD OF TRANSMITTING MOVING IMAGE AND SURVEILLANCE SYSTEM USING THE METHOD

BACKGROUND

1. Field

Methods and apparatuses consistent with exemplary embodiments relate to a method of transmitting a moving image and a surveillance system using the method, and more particularly, to a method of transmitting, by a host apparatus, a live-view moving image from a camera or a playback moving image from an image storing apparatus to a client apparatus through a communication network, and a surveillance system using the method.

2. Description of the Related Art

An example of a system that enables a host apparatus to transmit a live-view moving image from a camera or a playback moving image from an image storing apparatus to a client apparatus through a communication network includes a surveillance system.

The resolution of a moving image generated by a photoelectric conversion device of a camera, such as a charge coupled device (CCD), is relatively high. However, it is almost impossible to transmit a live-view moving image having high resolution to a client apparatus through a communication network.

Accordingly, a host apparatus drastically reduces the resolution of a moving image and then transmits the moving image having low resolution to the client apparatus. Thus, a user of the client apparatus may feel inconvenience due to an unclear moving image in a region of interest.

SUMMARY

One or more exemplary embodiments include a method of transmitting a moving image, wherein, when a host apparatus transmits a live-view moving image from a camera or a playback moving image from an image storing apparatus to a client apparatus through a communication network, the host apparatus is able to transmit a moving image effective to a user to the client apparatus regardless of a data amount, i.e., even if the data amount is relatively small, and a surveillance system using the method.

Additional aspects will be set forth in part in the description which follows and, in part, will be apparent from the description, or may be learned by practice of the exemplary embodiments.

According to an aspect of an exemplary embodiment, there is provided a method of transmitting a moving image, the method including: receiving a frame image having a first resolution from a camera; generating a first frame image having the first resolution and a second frame image having a second resolution with respect to the frame image of the moving image; extracting an image of a setting region from the first frame image having the first resolution that is higher than the second resolution; generating a combined frame image by combining the extracted image of the setting region and the second frame image having the second resolution; and transmitting the combined frame image to a client apparatus.

The transmitting of the combined frame image may include transmitting the second frame image having the second resolution and the extracted image of the setting region together.

According to an aspect of another exemplary embodiment, there is provided a method of transmitting a moving image, the method including: receiving a frame image having a first resolution from a camera; generating a first frame image having the first resolution and a second frame image having a second resolution with respect to the frame image of the moving image; extracting an image of a setting region from the second frame image having the second resolution that is lower than the first resolution; generating a combined frame image by combining the extracted image of the setting region and the first frame image having the first resolution; and transmitting the combined frame image to a client apparatus.

According to an aspect of another exemplary embodiment, there is provided a method of transmitting a moving image, the method including: receiving a frame image of the moving image from a camera; generating two frame images having different resolutions with respect to the frame image of the moving image; extracting an image of a setting region from one of the two frame images; generating a combined frame image by combining the extracted image of the setting region and the other one of the two frame images; and transmitting the combined frame image to a client apparatus.

According to an aspect of another exemplary embodiment, there is provided a surveillance system which uses the method of transmitting a moving image.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF EXEMPLARY EMBODIMENTS

The following descriptions and accompanying drawings are for understanding one or more exemplary embodiments, and well-known functions or constructions are not described in detail since they would obscure the exemplary embodiments with unnecessary detail.

Also, the descriptions and drawings are not provided to limit one or more exemplary embodiments, and the range of one or more exemplary embodiments shall be determined by claims. Terms used herein shall be construed as having meanings and concepts corresponding to technical aspects of the one or more exemplary embodiments to most suitably describe the one or more embodiments.

Reference will now be made in detail to exemplary embodiments which are illustrated in the accompanying drawings, wherein like reference numerals refer to like elements throughout. Expressions such as "at least one of," when preceding a list of elements, modify the entire list of elements and do not modify the individual elements of the list.

Figure 1:
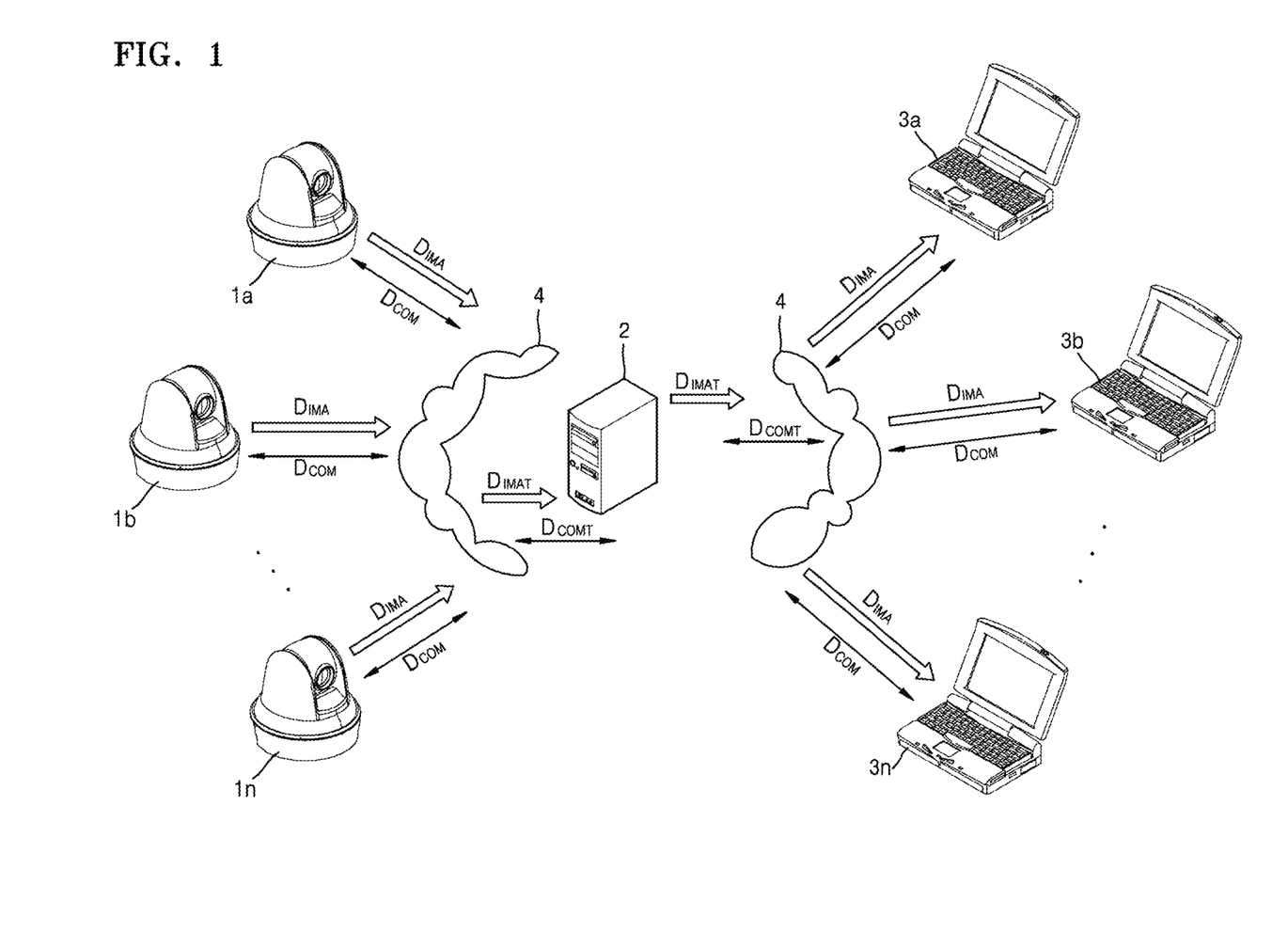
FIG. 1 is a diagram of a surveillance system using a method of transmitting a moving image, according to an exemplary embodiment.

FIG. 1 is a diagram of a surveillance system using a method of transmitting a moving image, according to an exemplary embodiment.

In FIG. 1, $D_{IMA}$ denotes moving image data input to a communication network 4, for example, the Internet, from each of cameras 1a through 1n, or moving image data input from the communication network 4 to each of client apparatuses 3a through 3n.

$D_{COM}$ denotes a communication signal between each of the cameras 1a through 1n and the communication network 4, or a communication signal between the communication network 4 and each of the client apparatuses 3a through 3n.

$D_{IMAT}$ denotes complex moving image data input from the communication network 4 to a host apparatus 2, or complex moving image data input from the host apparatus 2 to the communication network 4.

$D_{COMT}$ denotes a complex communication signal between the host apparatus 2 and the communication network 4.

Referring to FIG. 1, the host apparatus 2 is connected to the cameras 1a through 1n and the client apparatuses 3a through 3n through the communication network 4, such as the Internet. Here, the number of client apparatuses 3a through 3n is generally higher than the number of cameras 1a through 1n.

The cameras 1a through 1n transmit the moving image data $D_{IMA}$ of a live-view to the host apparatus 2 while communicating with the host apparatus 2.

The host apparatus 2 may store and transmit the moving image data $D_{IMA}$ from the cameras 1a through 1n while loading the moving image data $D_{IMA}$ in a volatile memory, or store the moving image data $D_{IMA}$ in a nonvolatile memory. For example, the host apparatus 2 may transmit the moving image data $D_{IMA}$ loaded according to channels from the volatile memory to the client apparatuses 3a through 3n, or store, in a recording medium such as a hard disk drive, the moving image data $D_{IMA}$.

The host apparatus 2 may generate two frame images having different resolutions, extract an image of a setting region from one of the two frame images, and combine the extracted image of the setting region and the other one of the two frame images to obtain a combined frame image. Here, the setting region may be a region fixed by a user, or a variable region, such as a motion detecting region. Since technologies of motion detection and face recognition are well known, descriptions thereof are not provided.

By transmitting the combined frame image to at least one of the client apparatuses 3a through 3n, a moving image may be effectively transmitted to the at least one of the client apparatuses 3a through 3n even if the moving image has a relatively low amount of data.

For example, if a resolution of the image of the setting region is relatively high and a region of interest to a user of the at least one of the client apparatuses 3a through 3n is the setting region, the user may conveniently view the moving image since the region of interest may be clear. This will be described in more detail with reference to FIGS. 2 through 6.

On the other hand, if the resolution of the image of the setting region is relatively low and a photographing refrain region, such as private region, is the setting region, a function of the photographing refrain region may be conveniently performed and an amount of transmission data may be reduced. This will be described in more detail later with reference to FIGS. 7 through 9.

Figure 2:
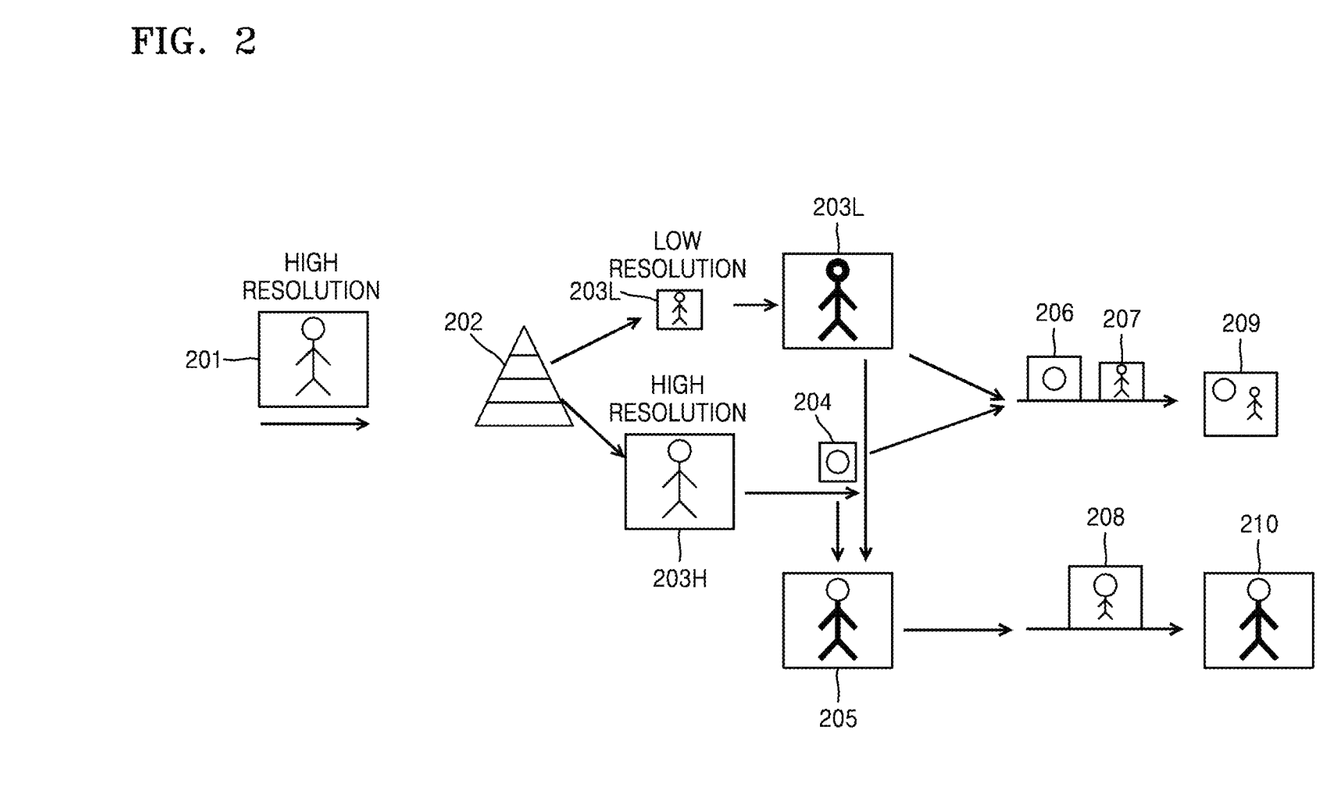
FIG. 2 is a diagram for describing the method of FIG. 1, according to a first exemplary embodiment.
Figure 3:
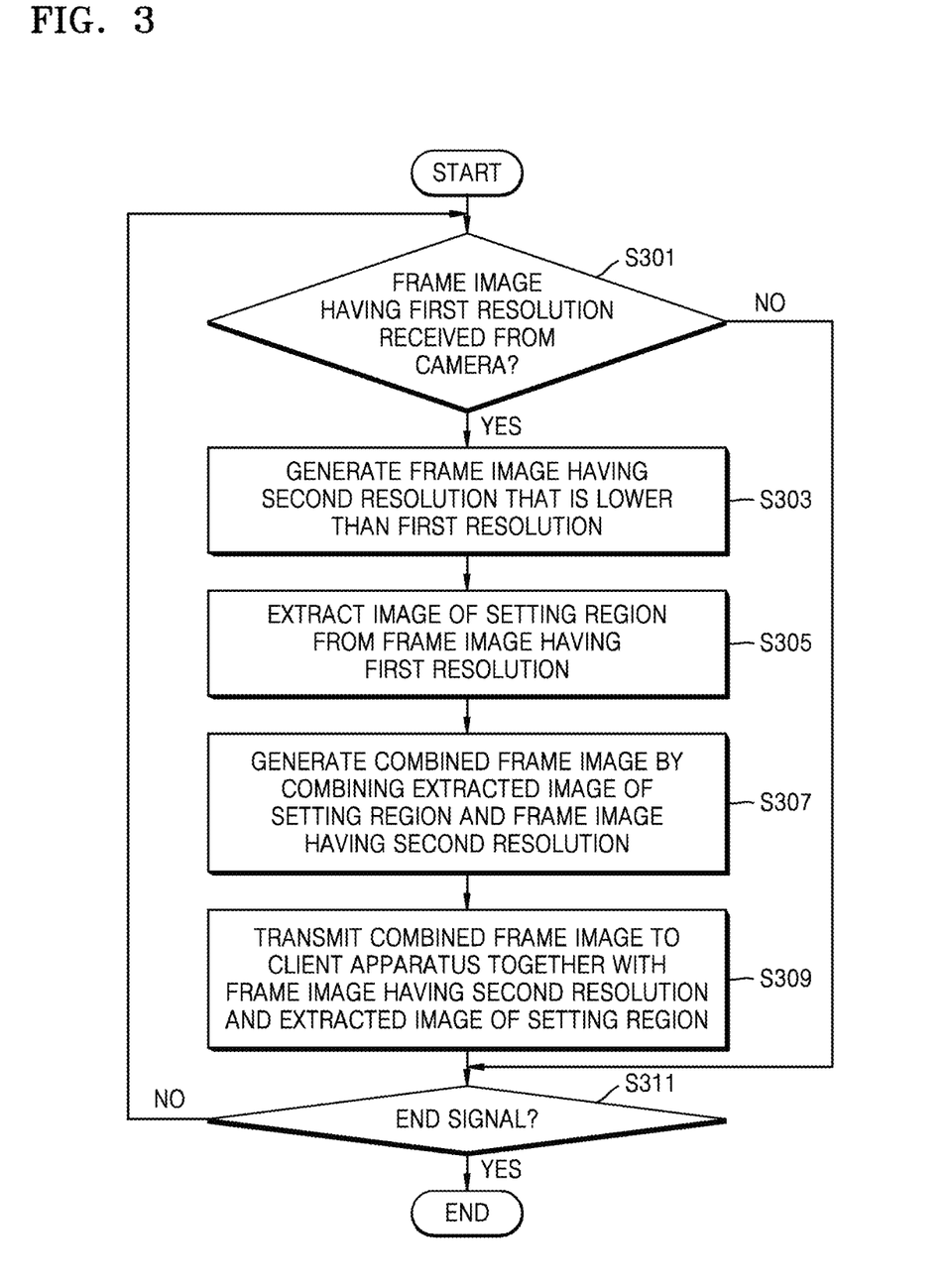
FIG. 3 is a flowchart for describing operations of a host apparatus of FIG. 1 performing the method according to the first exemplary embodiment of FIG. 2.

FIG. 2 is a diagram for describing the method of FIG. 1, according to a first exemplary embodiment. FIG. 3 is a flowchart for describing operations of the host apparatus 2 of FIG. 1 performing the method according to the first exemplary embodiment of FIG. 2. The method according to the first exemplary embodiment will now be described with reference to FIGS. 1 through 3.

Any one of the cameras 1a through 1n transmits a frame image 201 having a first resolution, i.e., a high resolution, to the host apparatus 2. If the frame image 201 is compressed, the host apparatus 2 restores the frame image 201. That is, the frame image 201 is a restored frame image. For example, the frame image 201 may be a playback moving image from an image storing apparatus included in the host apparatus 2.

When the frame image 201 is input from the any one of the cameras 1a through 1n in operation S301, the host apparatus 2 generates a frame image 203 having a second resolution that is lower than the first resolution in operation S303.

In other words, the host apparatus 2 generates a frame image 203H having the first resolution, i.e., the high resolution, and the frame image 203L having the second resolution, i.e., the low resolution, according to a resolution changing program 202. Since a resolution changing algorithm is well known, descriptions thereof are not provided.

The frame image 201 and the frame image 203H are the same frame images. In other words, the host apparatus 2 only generates the frame image 203L according to the resolution changing program 202. Alternatively, the host apparatus 2 may generate the frame image 203H having a resolution that is higher than the second resolution and lower than the first resolution according to the resolution changing program 202.

Next, the host apparatus 2 extracts an image 204 of a setting region from the frame image 203H, in operation S305.

Then, the host apparatus 2 generates a combined frame image 205 by combining the image 204 and the frame image 203L, in operation S307.

Then, the host apparatus 2 transmits a compressed combined frame image 208 to at least one of the client apparatuses 3a through 3n, together with a compressed frame image 207 having the second resolution and a compressed image 206 of the setting region, in operation S309.

In operation S309, the host apparatus 2 compresses the image 204, the frame image 203L, and the combined frame image 205 to generate the compressed image 206, the compressed frame image 207, and the compressed combined frame image 208, respectively.

Then, the host apparatus 2 transmits the compressed combined frame image 208, together with the compressed frame image 207 and the compressed image 206. The host apparatus 2 may transmit only the compressed combined frame image 208 to the at least one of the client apparatuses 3a through 3n.

By transmitting the compressed frame image 207 and the compressed image 206 in operation S309, the at least one of the client apparatus 3a through 3n may display the compressed frame image 207 and the compressed image 206 together in a form of picture-in-picture (PIP). Accordingly, the user of the at least one of the client apparatuses 3a through 3n may immediately determine whether the compressed image 206 is located in the compressed frame image 207. A reference numeral 209 in FIG. 2 denotes a PIP image obtained by restoring the compressed frame image 207 and the compressed image 206 by the at least one of the client apparatuses 3a through 3n. Also, a reference numeral 210 of FIG. 2 denotes a main image obtained by restoring the compressed combined frame image 208 by the at least one of the client apparatuses 3a through 3n.

Operations S301 through S309 are repeated until an end signal is received in operation 5311.

Figure 4:
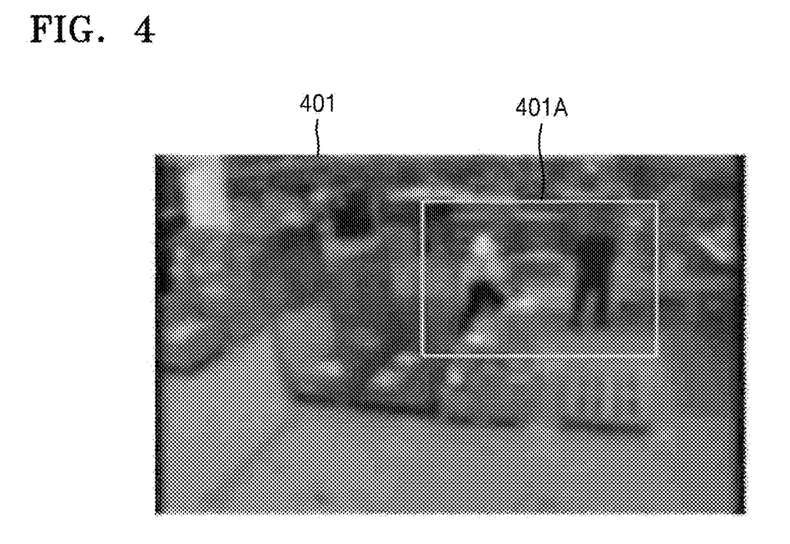
FIG. 4 is a diagram of an example of a frame image having a second resolution in FIG. 2.
Figure 5:
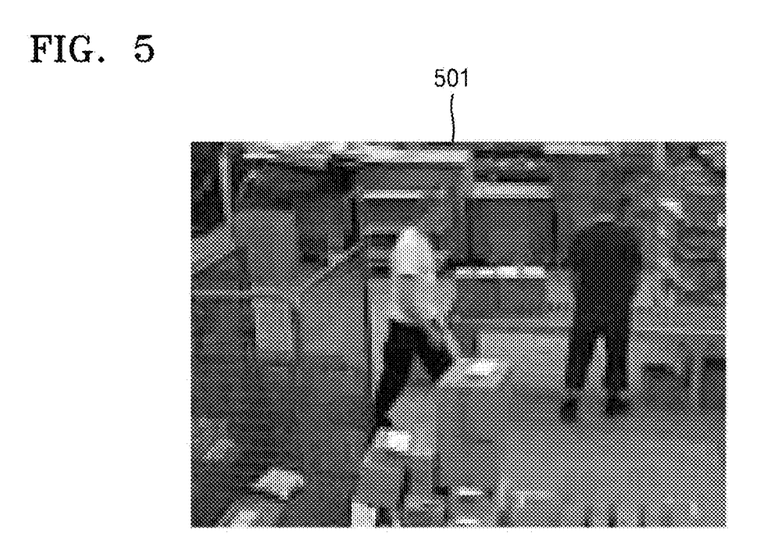
FIG. 5 is a diagram of an example of a frame image having a first resolution, which is obtained by enlarging a setting region of the frame image of FIG. 4.
Figure 6:
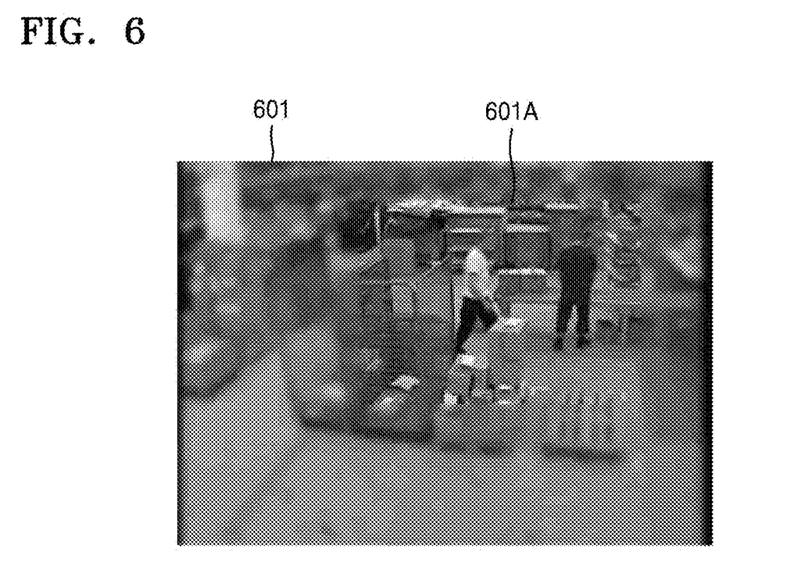
FIG. 6 is a diagram of an example of a combined frame image transmitted according to the first exemplary embodiment of FIG. 2.

FIG. 4 is a diagram of an example of a frame image 401 having a second resolution in FIG. 2. FIG. 5 is a diagram of an example of a frame image 501 having a first resolution, which is obtained by enlarging a setting region of the frame image 401 of FIG. 4. FIG. 6 is a diagram of an example of a combined frame image 601 transmitted according to the first exemplary embodiment of FIG. 2.

Referring to FIGS. 4 through 6, an image 601A of a setting region in the combined frame image 601 is clearer than an image 401A of a setting region in the frame image 401.

When a resolution of the image 601A of the setting region is relatively high and a region of interest to the user of the at least one of the client apparatuses 3a through 3n is the image 601A of the setting region, the user may conveniently view a moving image since the region of interest is clear.

According to the first exemplary embodiment described above with reference to FIGS. 2 through 6, since the combined frame image 601 is transmitted to the at least one of the client apparatuses 3a through 3n, a moving image may be effectively transmitted to the at least one of the client apparatuses 3a through 3n even if the moving image has a relatively low amount of data.

Figure 7:
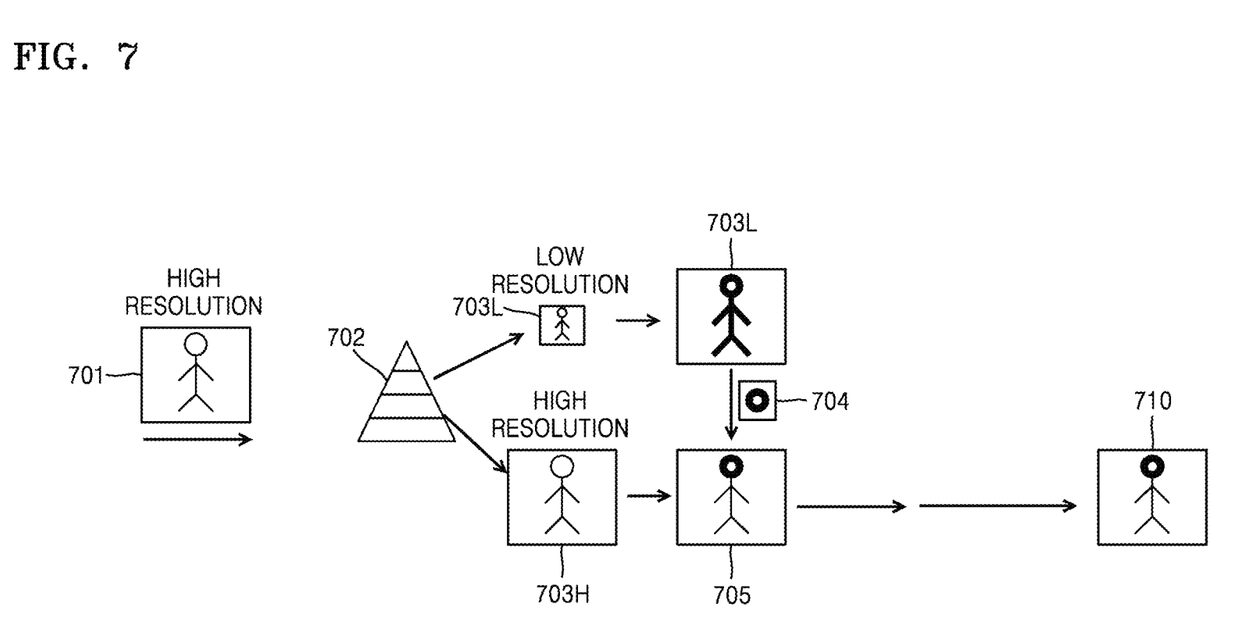
FIG. 7 is a diagram for describing a method of transmitting a moving image, according to a second exemplary embodiment.
Figure 8:
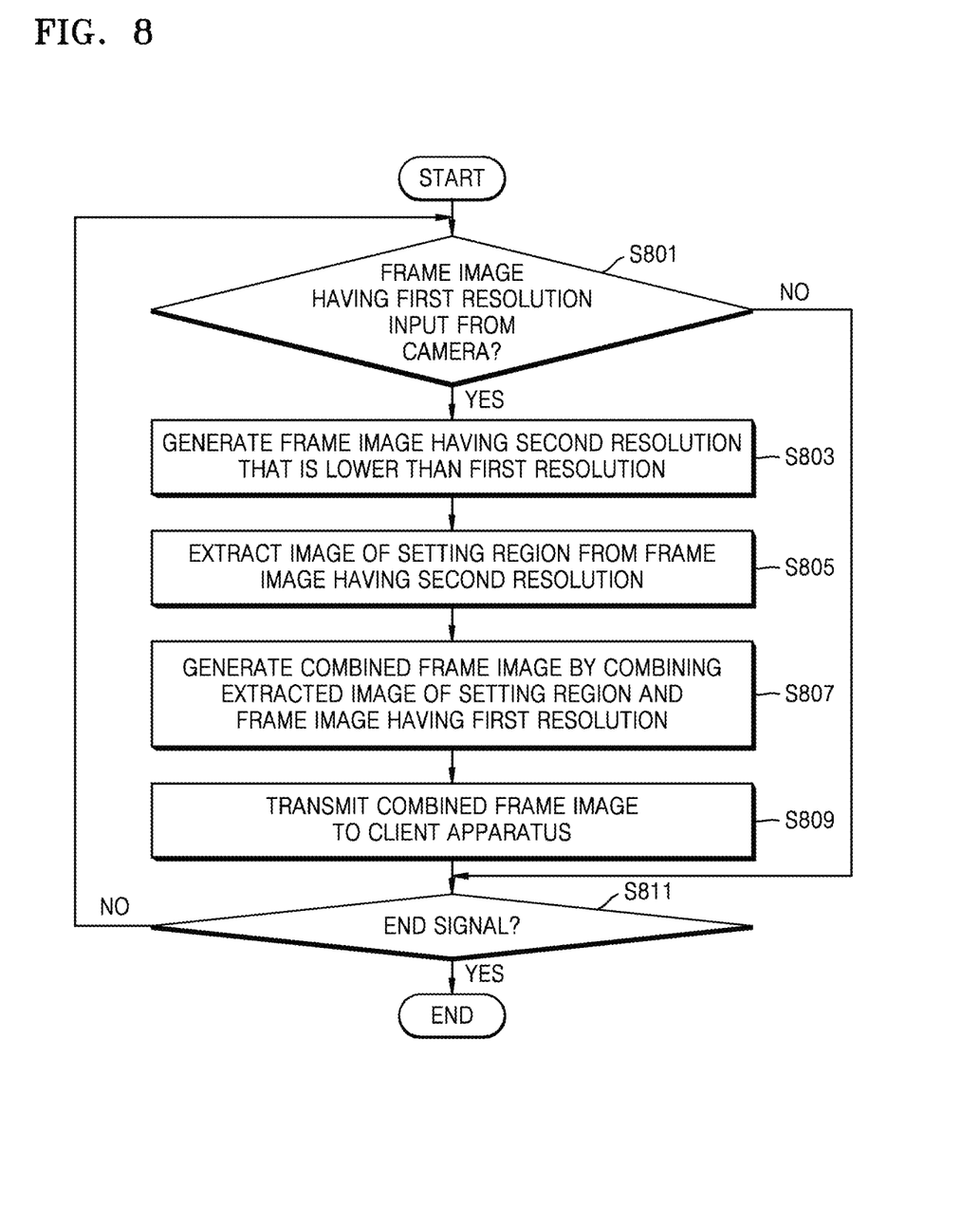
FIG. 8 is a flowchart for describing operations of the host apparatus of FIG. 1 performing the method according to the second exemplary embodiment of FIG. 7.

FIG. 7 is a diagram for describing a method of transmitting a moving image, according to a second exemplary embodiment. FIG. 8 is a flowchart for describing operations of the host apparatus 2 of FIG. 1 performing the method according to the second exemplary embodiment of FIG. 7. The method according to the second exemplary embodiment will now be described with reference to FIGS. 1, 7, and 8.

Any one of the cameras 1a through 1n transmits a frame image 701 having the first resolution, i.e., the high resolution, to the host apparatus 2. Here, if the frame image 701 is compressed, the host apparatus 2 restores the frame image 701. That is, the frame image 701 is a restored frame image. For example, the frame image 701 may be a playback moving image from the image storing apparatus included in the host apparatus 2.

When the frame image 701 is input from the any one of the cameras 1a through 1n in operation S801, the host apparatus 2 generates a frame image 703L having the second resolution that is lower than the first resolution in operation S803.

In other words, the host apparatus 2 generates a frame image 703H having the first resolution, i.e., the high resolution, and the frame image 703L having the second resolution, i.e., the low resolution, according to a resolution changing program 702. Since a resolution changing algorithm is well known, descriptions thereof are not provided.

The frame image 701 and the frame image 703H are the same frame images. In other words, the host apparatus 2 generates only the frame image 703L according to the resolution changing program 702. Alternatively, the host apparatus 2 may generate the frame image 703H having a resolution that is higher than the second resolution and lower than the first resolution.

Then, the host apparatus 2 extracts an image 704 of a setting region from the frame image 703L in operation S805.

Next, the host apparatus 2 generates a combined frame image 705 by combining the image 704 and the frame image 703H in operation S807.

Then, the host apparatus 2 transmits the combined frame image 705 to at least one of the client apparatuses 3a through 3n in operation S809. The host apparatus 2 may generate a compressed combined frame image by compressing the combined frame image 705, and transmit the compressed combined frame image to the at least one of the client apparatuses 3a through 3n. A reference numeral 710 of FIG. 7 denotes an image obtained by restoring the compressed combined frame image by the at least one of the client apparatuses 3a through 3n.

Operations S801 through S809 are repeated until an end signal is received in operation 5811.

Figure 9:
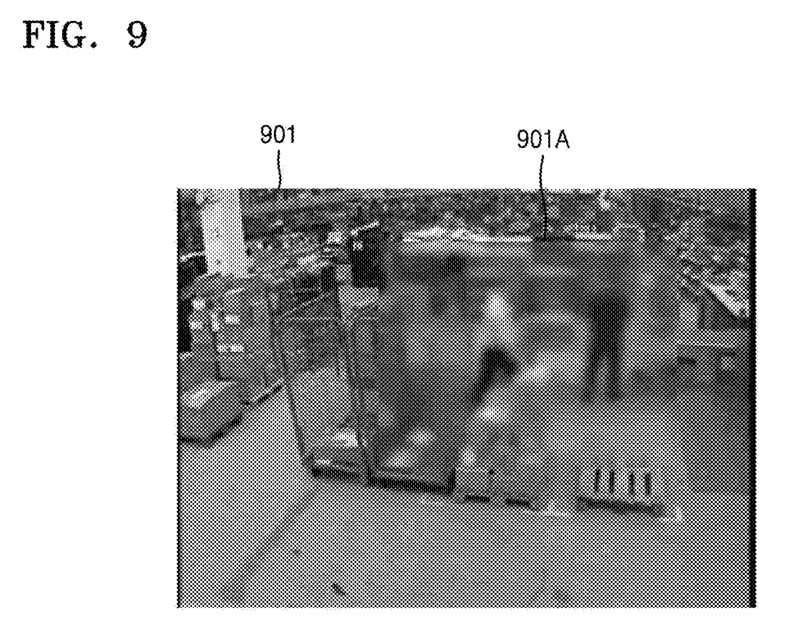
FIG. 9 is a diagram of an example of a combined frame image transmitted according to the second exemplary embodiment of FIG. 7.

FIG. 9 is a diagram of an example of a combined frame image 901 transmitted according to the second exemplary embodiment of FIG. 7.

Referring to FIG. 9, when a resolution of an image 901A of a setting region is relatively low, and a photographing refrain region, such as a private region, is the image 901A of the setting region, a function of the photographing refrain region may be conveniently performed and an amount of transmission data may be reduced.

According to the second exemplary embodiment described with reference to FIGS. 7 through 9, by transmitting the combined frame image 901 to at least one of the client apparatuses 3a through 3n, a moving image may be effectively transmitted to the at least one of the client apparatuses 3a through 3n even if a data mount of the moving image is relatively low.

As described above, according to one or more exemplary embodiments, after two frame images having different resolutions are generated, an image of a setting region is extracted from one of the two frame images and the extracted image is combined to the other one of the two frame images to obtain a combined frame image.

By transmitting the combined frame image to a client apparatus, a moving image may be effectively transmitted to the client apparatus even if the moving image has a relatively low amount of data.

For example, if a resolution of the image of the setting region is relatively high, and a region of interest to a user of the client apparatus is the setting region, the user may conveniently view the moving image since the region of interest is clear.

On the other hand, if the resolution of the image of the setting region is relatively low, and a photographing refrain region, such as a private region, is the setting region, a function of the photographing refrain region may be conveniently performed and an amount of transmission data may be reduced.

The exemplary embodiments can be implemented through computer readable code on a computer readable recording medium to control at least one processing element to implement any above-described embodiment. The computer readable recording medium may be any type of recording device that stores data which can be read by a computer system.

The computer readable recording medium may include read-only memory (ROM), random-access memory (RAM), CD-ROMs, magnetic tapes, floppy disks, optical data storage devices, etc. The computer readable recording medium can also be distributed over a network coupled to computer systems so that the computer readable code is stored and executed in a distributive manner. Furthermore, the processing element may include a processor or a computer processor, and processing elements may be distributed and/or included in a single device.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the appended claims.

What is claimed is:

1. A method of transmitting a moving image, the method comprising:
   receiving a frame image, of the moving image, having a first resolution from a camera;
   generating a first frame image having a resolution and a second frame image having a second resolution, based on the frame image of the moving image;
   extracting an image of a setting region from the first frame image having the resolution that is higher than the second resolution;
   generating a combined frame image by combining the extracted image of the setting region and the second frame image having the second resolution; and
   transmitting the combined frame image to a client apparatus,
   wherein the resolution of the first frame image is higher than the second resolution and lower than the first resolution.

2. The method of claim 1, wherein the transmitting the combined frame image comprises transmitting the combined frame image to the client apparatus in a compressed state.

3. The method of claim 1, wherein the transmitting the combined frame image comprises transmitting the second frame image having the second resolution and the extracted image of the setting region together.

4. The method of claim 3, wherein each of the combined frame image, the second frame image having the second resolution, and the extracted image of the setting region are transmitted to the client apparatus in a compressed state.

5. A method of transmitting a moving image, the method comprising:
   receiving a frame image, of the moving image, having a first resolution from a camera;
   generating a first frame image having a resolution and a second frame image having a second resolution, based on the frame image of the moving image;
   extracting an image of a setting region from the second frame image having the second resolution that is lower than the first resolution;
   generating a combined frame image by combining the extracted image of the setting region and the first frame image having the resolution; and
   transmitting the combined frame image to a client apparatus,
   wherein the resolution of the first frame image is higher than the second resolution and lower than the first resolution.

6. The method of claim 5, wherein the transmitting the combined frame image comprises transmitting the combined frame image to the client apparatus in a compressed state.

7. A method of transmitting a moving image, the method comprising:
   receiving a frame image of the moving image from a camera;
   generating two frame images having different resolutions, based on the frame image of the moving image;
   extracting an image of a setting region from one of the two frame images;
   generating a combined frame image by combining the extracted image of the setting region and the other one of the two frame images; and
   transmitting the combined frame image to a client apparatus,
   wherein the generating two frame images comprises generating one frame image having resolution which is higher than a resolution of the other frame and lower than a resolution of the received frame image of the moving image.

8. The method of claim 7, wherein if a resolution of the image of the setting region is high, the combined frame image is generated by combining the image extracted from a first frame image having a resolution that is higher than a resolution of a second frame image and the second frame image.

9. The method of claim 7, wherein if a resolution of the image of the setting region is low, the combined frame image is generated by combining the image extracted from a second frame image having a resolution that is lower than a resolution of a first frame image and the first frame image.

10. The method of claim 7, wherein the transmitting the combined frame image comprises transmitting the combined frame image to the client apparatus in a compressed state.

11. A surveillance system comprising a camera, a client apparatus, and a host apparatus which transmits a live-view moving image from the camera or a playback moving image from an image storing apparatus to the client apparatus through a communication network,
   wherein the host apparatus receives a frame image, of the moving image, having a first resolution from the camera, generates a first frame image having a resolution and a second frame image having a second resolution based on the frame image of the moving image, extracts an image of a setting region from the first frame image having the resolution that is higher than the second resolution, generates a combined frame image by combining the extracted image of the setting region and the second frame image having the second resolution, and transmits the combined frame image to the client apparatus,
   wherein the resolution of the first frame image is higher than the second resolution and lower than the first resolution.

12. The surveillance system of claim 11, wherein the combined frame image is transmitted to the client apparatus in a compressed state.

13. The surveillance system of claim 11, wherein the combined frame image is transmitted to the client apparatus together with the second frame image having the second resolution and the extracted image of the setting region.

14. The surveillance system of claim 13, wherein the client apparatus displays the second frame image having the second resolution and the extracted image of the setting region together as a picture-in-picture (PIP).

15. The surveillance system of claim 13, wherein each of the combined frame image, the second frame image having the second resolution, and the extracted image of the setting region is transmitted to the client apparatus in a compressed state.

16. A surveillance system comprising a camera, a client apparatus, and a host apparatus which transmits a live-view moving image from the camera or a playback moving image from an image storing apparatus to the client apparatus through a communication network,
   wherein the host apparatus receives a frame image of the moving image from the camera, generates a first frame image having a first resolution and a second frame image having a second resolution based on the frame image of the moving image, extracts an image of a setting region from the second frame image having the second resolution that is lower than the first resolution, generates a combined frame image by combining the extracted image of the setting region and the first frame image having the first resolution, and transmits the generated combined frame image to the client apparatus,
   wherein the first resolution is higher than the second resolution and lower than a resolution of the frame image of the moving image.

17. The surveillance system of claim 16, wherein the combined frame image is transmitted to the client apparatus in a compressed state.

* * * * *